US012545770B2

(12) United States Patent
Eisenhut et al.

(10) Patent No.: US 12,545,770 B2
(45) Date of Patent: Feb. 10, 2026

(54) TREATMENT OF ELASTOMERIC MATERIALS WITH SUPERCRITICAL CO2

(71) Applicant: Novasterilis Inc., Lansing, NY (US)

(72) Inventors: Tony Eisenhut, Lansing, NY (US);
David Bednarski, Lansing, NY (US);
James Gustafson, Lansing, NY (US);
Mark McHugh, Lansing, NY (US);
Eric Eisenhut, Lansing, NY (US)

(73) Assignee: NOVASTERILIS INC., Lansing, NY (US)

( * ) Notice: Subject to any disclaimer, the term of this patent is extended or adjusted under 35 U.S.C. 154(b) by 508 days.

(21) Appl. No.: 18/320,584

(22) Filed: May 19, 2023

(65) Prior Publication Data
US 2024/0384048 A1 Nov. 21, 2024

(51) Int. Cl.
*C08J 7/00* (2006.01)
*B05D 7/02* (2006.01)

(52) U.S. Cl.
CPC ........ *C08J 7/00* (2013.01); *B05D 7/02* (2013.01); *C08J 2300/26* (2013.01)

(58) Field of Classification Search
None
See application file for complete search history.

(56) References Cited

U.S. PATENT DOCUMENTS 5,550,211 A * 8/1996 DeCrosta ........... B01D 11/0203
528/480
6,149,864 A * 11/2000 Dillow ................... A61L 2/16
422/32

(Continued)

FOREIGN PATENT DOCUMENTS

JP 2006059683 A * 3/2006 ............ C08J 7/02

OTHER PUBLICATIONS

JP 2006059683 A, machine translation, 2006 (Year: 2006).*

Primary Examiner — Satya B Sastri
(74) Attorney, Agent, or Firm — WELSH FLAXMAN & GITLER LLC

(57) ABSTRACT

A process for treating elastomeric materials with supercritical $CO_2$ such that they can be used or reused as intended prior to exposure to supercritical $CO_2$. The process includes the following steps: (a) loading the elastomeric materials into a vessel and closing the vessel; (b) introducing $CO_2$ into the vessel and creating a supercritical $CO_2$ environment within the vessel; (c) subjecting the elastomeric materials contained within the vessel to the supercritical $CO_2$ environment for a predetermined period of time; (d) after the predetermined period of time introducing an inert gas under controlled pressure into the vessel to force the supercritical $CO_2$ out of the vessel; (e) continuing introducing inert gas until the supercritical $CO_2$ has been exhausted from the vessel; maintaining the inert gas within the vessel at least 1,500 psi to create an inert gas environment within the vessel to subject the elastomeric materials contained within the vessel to the inert gas environment for a time period sufficient to penetrate the elastomeric materials; (f) depressurizing the vessel to 0 psi by exhausting the inert gas from the vessel; and optionally including the step of filling the vessel with an inert gas under pressure prior to step (b) introducing $CO_2$ into the vessel and creating a supercritical $CO_2$ environment within the vessel.

4 Claims, 1 Drawing Sheet

(56) References Cited

U.S. PATENT DOCUMENTS 6,241,828 B1 * 6/2001 Barnes ................. C08C 3/02
528/495
6,610,251 B1 * 8/2003 Kanno .................. A61L 2/206
422/39

* cited by examiner

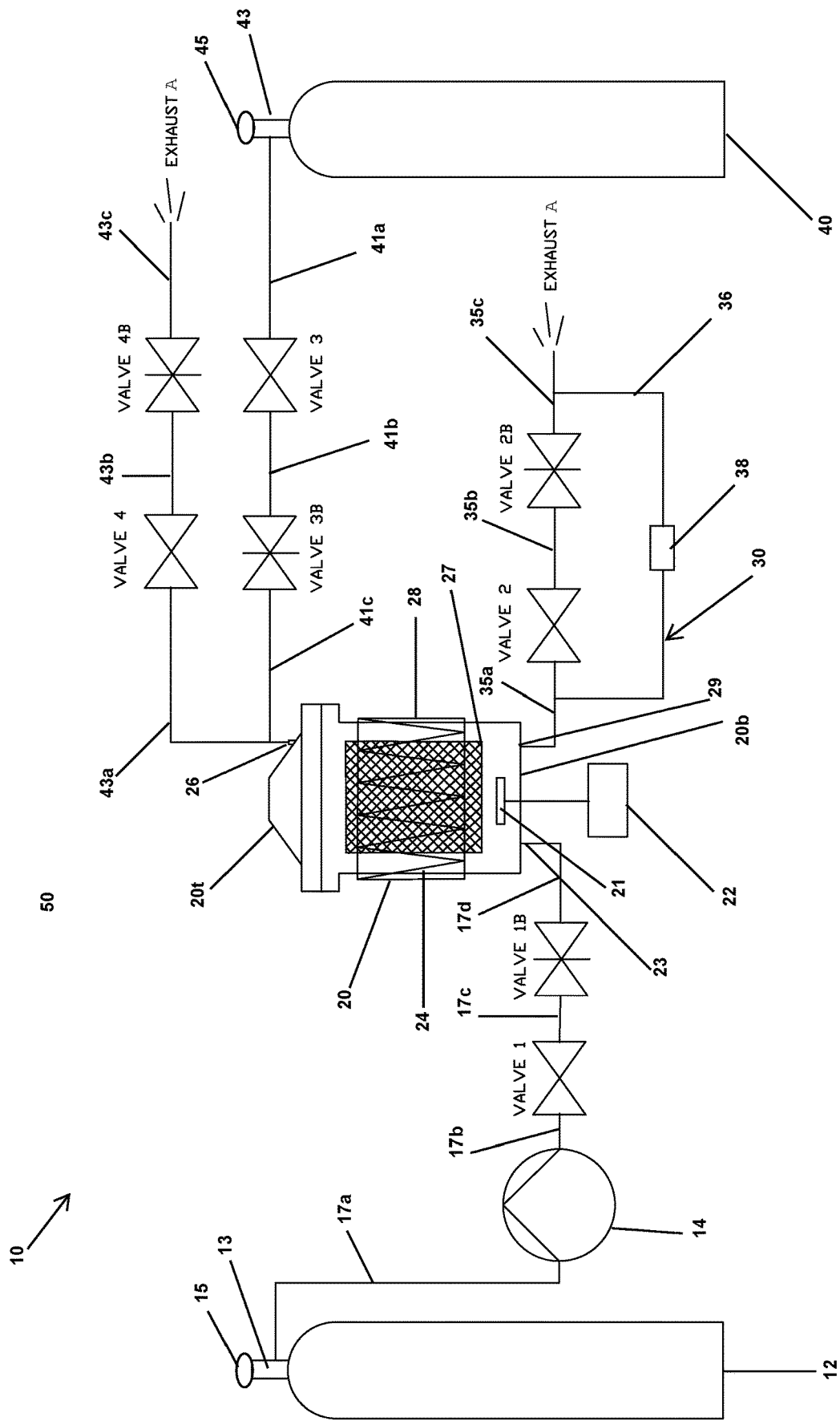

TREATMENT OF ELASTOMERIC MATERIALS WITH SUPERCRITICAL CO2

BACKGROUND OF THE INVENTION

1. Field of the Invention

This invention relates to treating elastomeric materials with supercritical carbon dioxide.

2. Description of the Related Art

Supercritical carbon dioxide has not been compatible with elastomeric materials because upon depressurization from the pressure necessary to achieve the supercritical state to atmospheric pressure, carbon dioxide expands. The expansion ratio of carbon dioxide is 535:1, which results in the expansion of the elastomeric material and ballooning sometimes to the point of rupturing. For elastomers to be used in various supercritical carbon dioxide applications, a process is needed to minimize or eliminate the elastomeric "ballooning" during the depressurization from the supercritical state.

SUMMARY OF THE INVENTION

It is, therefore, an object of the present invention to provide a process for treating elastomeric materials with supercritical $CO_2$ such that they can be used or reused as intended prior to exposure to supercritical $CO_2$. The process includes the following steps: (a) loading the elastomeric materials into a vessel and closing the vessel; (b) introducing $CO_2$ into the vessel and creating a supercritical $CO_2$ environment within the vessel; (c) subjecting the elastomeric materials contained within the vessel to the supercritical $CO_2$ environment for a predetermined period of time; (d) after the predetermined period of time introducing an inert gas under controlled pressure into the vessel to force the supercritical $CO_2$ out of the vessel; (e) continuing introducing inert gas until the supercritical $CO_2$ has been exhausted from the vessel; maintaining the inert gas within the vessel at least 1,500 psi to create an inert gas environment within the vessel to subject the elastomeric materials contained within the vessel to the inert gas environment for a time period sufficient to penetrate the elastomeric materials; and (f) depressurizing the vessel to 0 psi by exhausting the inert gas from the vessel.

It is another object to further include the step of opening vessel to retrieve treated elastomeric materials after depressurization.

It is another object to include the step of filling the vessel with an inert gas under pressure prior to introducing $CO_2$ into the vessel and creating a supercritical $CO_2$ environment within the vessel.

It is another object to exhaust all of the supercritical $CO_2$ from the vessel before the elastomeric materials are subject to the inert gas environment.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a schematic view of a system to perform a process of treating elastomeric materials in a vessel with supercritical $CO_2$, then purging the supercritical $CO_2$ from the vessel with an inert gas, and then treating the elastomeric materials with the inert gas.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

As shown in FIG. 1, a system 10 is disclosed that is used to treat elastomeric materials, such as syringes. Elastomeric materials are those which are made from elastomers or contain elastomer components, wherein an elastomer is a natural or synthetic polymer having elastic properties and are capable of recovering their original shape when a load is removed. Examples of elastomers are natural rubbers, styrene-butadiene block copolymers, polyisoprene, polybutadiene, ethylene propylene rubber, ethylene propylene diene rubber, silicone elastomers, fluoroelastomers, polyurethane elastomers, and nitrile rubbers. By treating the elastomeric materials in accordance herewith the elastomeric materials may be cleaned and/or sterilized without damaging the elastomeric materials when the system is depressurized.

The system 10 includes a first tank 12 containing $CO_2$. A regulator 13 and a pressure gauge 15 extend from the first tank 12. In accordance with a disclosed embodiment, the first tank 12 is a $CO_2$ stock cylinder. Vessel 20 is preferably a purge capable NovaGenesis 2200 (NG2200 available from NovaSterilis, Inc. 3109 N Triphammer Rd Lansing, NY 14882) with an 18.9-L compacity and includes a heater 28 around the exterior of the vessel 20. Piping 17a connects the regulator 13 extending from a first tank 12 to a pump 14. Piping 17b connects the pump 14 to a $CO_2$ inlet valve 1. Piping 17c connects the $CO_2$ inlet valve 1 to a $CO_2$ inlet speed valve 1B. Piping 17d connects the $CO_2$ inlet speed valve 1B to inlet port 23 located at the bottom 20b of a vessel 20. The vessel 20 includes a chamber 24 which can be selectively closed with a lid 20t. The lid 20t includes an inlet/outlet port 26. Within the chamber 24 is a stirrer 21 controlled by a motor 22 at the bottom 20b of the vessel 20.

An exhaust circuit 30 exits from outlet port 29 at the bottom 20b of the vessel 20. The exhaust circuit 30 includes exhaust piping 35a which runs to a vessel bottom exhaust valve 2. Exhaust piping 35b connects the vessel bottom exhaust valve 2 to a vessel bottom exhaust speed valve 2B, and exhaust piping 35c exits the vessel bottom exhaust speed valve 2B and exhausts gas to atmosphere A. A control system 50 includes software that can be programed to open and close all of the valves. The control system 50 opens the valve, then adjusts the speed valve based on the temperature of the outlet port and the required flow rates as determined by the outlet speed valve. If the system shows the pressure decreasing or increasing, the software adjusts the speed valve to maintain the desired pressure. The exhaust circuit 30 further includes a piping loop 36 with a pressure relief valve 38. Pressure relief valve 38 is a fixed valve that does not actuate until the pressure within the chamber 24 meets and exceeds the allowable limit. At this point the pressure relief valve 38, in the form of a spring relief valve, opens and serves as an emergency escape route for the $CO_2$. This is a safety feature that is only used if valves 2 and 2B malfunction by not opening to reduce pressure.

The system 10 further includes an inert gas second tank 40 containing an inert gas, preferably nitrogen. The inert gas second tank 40 includes a regulator 43 and pressure gauge 45 extending from the top thereof. In accordance with a disclosed embodiment, the inert gas second tank 40 is a high pressure cylinder and the regulator 43 is set to 1,500 psi. Piping 41a connects the inert gas second tank 40, through regulator 43, to an inert gas inlet valve 3, piping 41b connects the inert gas inlet valve 3 to an inert gas inlet speed valve 3B, piping 41c connects the inert gas inlet speed valve 3B to an inlet/outlet port 26 near the top of the vessel 20. Piping 43a connects the lid 20t of vessel 20, via the inlet/outlet port 26, to an outlet inert gas exhaust valve 4. Piping 43b connects the outlet inert gas exhaust valve 4 to an outlet inert gas exhaust speed valve 4B. Piping 43c exits the outlet inert gas exhaust speed valve 4B and exhausts gas to atmosphere A. In another embodiment, the inert gas can be below the pressure of supercritical $CO_2$ but it would go to a pump that would then bring it up to 1500 psi before displacing the supercritical $CO_2$.

Valves 1, 2, 3, and 4 are ball valves which can be reliably closed to stop all flow through the valves and are controlled by solenoids, but can also be manually controlled valves. Speed valves 1B, 2B, 3B, and 4B are motor controlled, but can also be manually controlled valves and can be opened and closed when rotated to vary the amount of flow through the speed valves. The heater 28 is coupled to thermocouples (not shown) in the chamber 24 to received feedback as to the temperature in the chamber 24. The vessel 20 includes multiple pressure transducers (not shown) to monitor the pressure in the chamber 24 and provide feedback to the pump 14.

The system 10 is used in a process to treat products such as syringes that include elastomeric materials. Briefly, the process for treating elastomeric materials is as follows:

1. The vessel 20 is loaded with the elastomeric materials to be treated and the vessel is then charged with gas or liquid $CO_2$. The elastomeric materials, by way of example only, may include medical devices such as syringes and multi-channel endoscopes;
2. The temperature and pressure in the vessel 20 is controlled to create a supercritical state within the vessel 20;
3. A supercritical $CO_2$ treatment process is performed on the elastomeric materials within the vessel 20;
4. Once the supercritical $CO_2$ treatment process is complete, the supercritical $CO_2$ in the elastomeric materials is slowly replaced with an inert gas by forcing the supercritical $CO_2$ from the elastomeric materials such that the elastomeric materials do not expand or rupture when depressurized;
5. The supercritical $CO_2$ is slowly purged from the vessel 20 by continuing to fill the vessel with inert, non-expanding gas (It is noted that if the inert gas used during the process is heavier than the supercritical $CO_2$ filling from the bottom with the inert gas would exhaust the supercritical $CO_2$ from the top otherwise the inert gas is filled from the top to exhaust the supercritical $CO_2$ from the bottom);
6. Once the $CO_2$ is fully drained, the inert gas is allowed to dwell for a predetermined period of time to penetrate the elastomeric materials;
7. The inert gas is then discharged preferably to the atmosphere; and
8. Then the vessel is opened and the elastomeric materials are retrieved.

A first embodiment of a process in accordance with the present invention will now be described in more detail. The process involves steps which are similar to those disclosed in U.S. Pat. No. 7,108,832 owned by Applicant, and which is hereby incorporated by reference. These steps will be referred to as the NovaProcess.

The process begins with the purge capable vessel 20 in its starting state wherein the system is powered on and the heater 28, the stirrer 21, and the pump 14 are off and all valves are closed. Once the system is powered on a control system including a computer, power supplies, valve actuators, and heater control, stirrer control and lid control are all activated. The components of the system 10 including, but not limited to, the valves, the pump, the stirrer, the heater and opening and closing of the vessel lid may be fully automated and controlled by the computer control system 50. However, operation of all of the components of the system 10 may also be manually controlled.

The NovaProcess steps include loading the vessel, humidification (optional), and a supercritical $CO_2$ treatment cycle.

Loading the Vessel

To begin the process a cellulosic absorptive pad (referred to as a NovaPad) receives an aliquot of an entrainer comprised of a mixture of hydrogen peroxide, acetic acid and peracetic acid (referred to as NovaKill) and is placed into a pad holder (not shown) located in the bottom of a removable basket 27. The basket 27 is then loaded with the elastomeric materials that are to be treated and placed within the vessel chamber 24. A predetermined amount of water is misted on the elastomeric materials and the inner walls of the vessel 20. The vessel 20 is then closed and locked, sealing the lid 20t and bottom 20b of the vessel 20 together to form the air-tight chamber 24 within vessel 20.

Humidification (Optional)

An optional humidification step may then be performed. The heater 28 is turned on and set to 35° C. Depending upon the elastomers being treated, the stirrer 21 may be turned on. The elastomers are then incubated in the vessel 20 for a predetermined amount of time, typically 60 minutes to 120 minutes.

Supercritical $CO_2$ Treatment Cycle

Next, the supercritical $CO_2$ treatment cycle will be described. The supercritical $CO_2$ treatment cycle is preferably used to clean or sterilize the materials being treated such that they can be used or reused for their intended purpose. The vessel 20 is pressurized, the heater 28 is on and is set to 35° C., the stirrer motor 22 is turned on, and $CO_2$ is introduced from the first tank 12 to create a supercritical $CO_2$ environment within the chamber 24.

$CO_2$ is introduced in the following manner. After confirming that all valves are closed, the $CO_2$ inlet valve 1 is opened and then the $CO_2$ inlet speed valve 1B is slowly opened to let $CO_2$ flow into the vessel 20. When the pressure in the vessel 20 stops increasing, indicating equilibrium with the $CO_2$ stock tank 12 and usually around 750-800 psi, the $CO_2$ inlet speed valve 1B is fully opened. The pump 14 is turned on to fill the vessel 20 to 1,500 psi at 35° C. while the temperature and pressure within the vessel 20 are monitored. Once 1,500 psi at 35° C. is reached, the $CO_2$ inlet valve 1 and the $CO_2$ inlet speed valve 1B are closed, and a timer is set for a predetermined dwell period of time while the heater 28 and stirrer 21 remain on.

The supercritical $CO_2$ treatment cycle is followed by an inert gas purge cycle.

Inert Gas Purge Cycle

To begin the inert gas purge cycle the stirrer 21 is turned off and the heater 28 remains on and is set at 35° C. After confirming that all valves are closed, the inert gas purge process begins.

Next, the vessel bottom exhaust valve 2 is opened to allow the supercritical $CO_2$ to be drained from the vessel 20 and the inert gas inlet valve 3 is opened to allow inert gas to flow out of the inert gas second tank 40. The inert gas inlet speed valve 3B is then slowly opened to allow inert gas to flow into the chamber 24, through the top of the vessel 20, to a final pressure of 1,500 psi. Thereafter, the vessel bottom exhaust speed valve 3B is slowly opened allowing supercritical $CO_2$ to flow out of the bottom 20b of the vessel 20 through the exhaust piping 35c at a rate that maintains an internal pressure of 1,500 psi within vessel 20. The vessel bottom exhaust speed valve 3B and the inert gas inlet speed valve 3B are adjusted to control the flow rate and thus the internal pressure within the vessel 20 and the turnover rate of supercritical $CO_2$ exiting and the inert gas entering the vessel 20. The flow rate between the speed valves 2B and 3B is maintained by keeping the chamber pressure at 1500 psi. As the pressure drops speed valve 2B is partially closed to slow the outflow of $CO_2$. The flow rate will be a set value of opening the speed valve 3B a certain number of degrees and closing the speed valve 2B a certain number of degrees.

Exhausting all of the supercritical $CO_2$ from the vessel 20 will result in the formation of frost on the exterior surface of the exhaust piping 35a, 35b, 35c. When the supercritical $CO_2$ has stopped flowing from the vessel 20 and only inert gas remains in the vessel 20, inert gas will begin flowing out of the vessel 20. However, since testing is not performed a small percentage of $CO_2$ may still reside in the vessel. The inert gas flowing through the exhaust piping 35a, 35b, 35c will cause the frost on the piping 35a, 35b, 35c to melt indicating that the vessel 20 no longer contains any appreciable amount of supercritical $CO_2$ and the vessel bottom exhaust speed valve 3B can be closed. Additionally, there is an audible change in pitch as the gas exhausting from the exhaust piping 35c changes from supercritical $CO_2$ to inert gas. Alternatively, a temperature probe can monitor the temperature of the gas exiting through the exhaust line and when the temperature of the exhaust gas is above freezing, the chamber has been emptied of supercritical $CO_2$.

The turnover of supercritical $CO_2$ to inert gas continues until there is 1,600 to 1,700 psi remaining in the high pressure inert gas second tank 40. At this point the vessel bottom exhaust speed valve 3B is closed and the inert gas dwell will be started.

Inert Gas Dwell

During the inert gas dwell step, the inert gas inlet valve 3 and the inert gas inlet speed valve 3B are left open to maintain 1,500 psi inert gas in the vessel 20 and all other valves are closed. The heater 28 remains on and is set to 35° C. The stirrer 21 is also turned on. The elastomers are then incubated in the vessel 20 for a predetermined amount of time sufficient to penetrate the elastomeric materials, typically 60 to 300 minutes followed by depressurization of the vessel 20. The time will vary depending upon the elastomeric materials being treated. After the inert gas dwell is completed depressurization begins.

Depressurization

During the depressurization step, the heater 28 and the stirrer 21 remain on and the inert gas inlet speed valve 3B is closed. The inert gas inlet valve 3 is then closed. The vessel bottom exhaust valve 2 is opened and the vessel bottom exhaust speed valve 3B is opened to let the inert gas out of the bottom 20b of the vessel 20 at a predetermined rate. Once the vessel 20 is depressurized to 0 psi and no audible depress sound is heard, the heater 28 and stirrer 21 are turned off, and the vessel 20 can be opened to retrieve the processed elastomeric materials. Due to the removal of the supercritical $CO_2$ and the inert gas dwell, the elastomeric materials do not balloon or distort and continue to be usable for their intended purpose. The audible depress sound is a hissing sound as the gas/fluid exits to exhaust.

After depressurization the vessel 20 is opened and the materials that have been treated are retrieved.

In a second embodiment the process includes an inert gas pre-fill step prior to the supercritical $CO_2$ treatment cycle and begins as above with the loading of the vessel 20.

Loading the Vessel

Once again to begin the process a NovaPad with NovaKill is first placed into a pad holder located in the bottom of a removable basket 27. The basket 27 is then loaded with the elastomeric materials, which are to be treated. The basket 27 is then placed within the vessel chamber 24. A predetermined amount of water is misted on the elastomeric materials and the inner walls of the vessel 20. The vessel 20 is then closed and locked sealing the lid 20t and bottom 20b of the vessel 20 together to form the air-tight chamber 24 within the vessel 20.

Humidification (Optional)

An optional humidification step may then be performed. The heater 28 is turned on and is set to 35° C. Depending upon the elastomers being treated, the stirrer 21 may be turned on. The elastomers are then incubated in the vessel 20 for a predetermined amount of time, typically 60 minutes to 120 minutes.

Inert Gas Pre-Fill

The high pressure inert gas second tank 40 is monitored to assure that there is ~2,700 psi in the inert gas second tank 40 and that the regulator is set to 1,500 psi. The heater 28 is then turned on and is set to 35° C. The operator should ensure that the stirrer 21 is off and confirm that all valves are closed.

The inert gas inlet valve 3 is opened and the inert gas inlet speed valve 3B is then slowly opened to allow inert gas to flow into the vessel 20 through the lid 20t. The vessel 20 continues to be filled with inert gas until 1,400 psi at 35° C. is reached. The speed at which this is performed is controlled by the user via the controller of the system 10. Once 1,400 psi is reached within the vessel 20, the inert gas inlet speed valve 3B is closed and the inert gas inlet valve 3 is closed. The supercritical $CO_2$ treatment cycle is then performed.

Supercritical $CO_2$ Treatment Cycle

First, all the valves are confirmed to be closed. Pressurization of vessel 20 then begins. The $CO_2$ inlet valve 1 is first opened and then $CO_2$ inlet speed valve 1B is opened to let $CO_2$ into the vessel 20. Due to the greater pressure of the inert gas in the vessel 20, $CO_2$ will not enter the vessel 20 without operating the pump 14.

As a result, the pump 14 is turned on and the vessel 20 is filled to 1,500 psi at 35° C. This will cause $CO_2$ to flow into the vessel 20 from the bottom 20b. Due to the pressure in the vessel 20, the incoming $CO_2$ will enter the vessel 20 in a supercritical state. When the pressure in the vessel 20 reaches 1,500 psi, the outlet inert gas exhaust valve 4 and the outlet inert gas exhaust speed valve 4B are slightly opened. As $CO_2$ flows into the vessel 20 from the bottom 20b, the inert gas will be displaced and exit the vessel 20 through piping 43a connected to the lid 20t of the vessel 20. The top port 26 is connected to a high pressure flexible hose that allows the lid 20t to be moved up and down. The vessel 20 continues to be filled with supercritical $CO_2$ from the bottom 20b while monitoring the pressure and maintaining ~1,500 psi in the vessel 20 by controlling both the $CO_2$ inlet speed valve 1B and the outlet inert gas exhaust speed valve 4B. Running the pump 14 for 10 minutes should be sufficient time to completely turnover the gas in the vessel 20 from inert gas to supercritical $CO_2$. The run time of the pump 14 could vary depending upon what pump is employed and the specifications of the pump.

After removing all of the inert gas, the outlet inert gas exhaust valve 4 is closed and then the outlet inert gas exhaust speed valve 4B is closed. The pump 14 is then turned off. Now the supercritical $CO_2$ dwell step can begin.

Supercritical $CO_2$ Dwell

The heater 28 remains on and is set to 35° C. The stirrer 21 is turned on. The elastomers are then incubated in the vessel 20 for a predetermined amount of time, typically 30 to 300 minutes, followed by the inert gas purge cycle as discussed above and repeated below.

Inert Gas Purge Cycle

During the inert gas purge cycle, the stirrer 21 is turned off, and the heater 28 remains on and is set at 35° C. After confirming that all valves are closed the inert gas purge cycle begins.

To begin, the vessel bottom exhaust valve 2 is opened to allow $CO_2$ to be drained from the vessel 20 and the inert gas inlet valve 3 is opened to allow inert gas to flow out of the inert gas second tank 40. The inert gas inlet speed valve 3B is then slowly opened to allow inert gas to flow into the chamber 24, through the top of vessel 20, to a final pressure of 1,500 psi. Thereafter, the vessel bottom exhaust speed valve 2B is slowly opened allowing supercritical $CO_2$ to flow out of the bottom 20b of the vessel 20 through the exhaust piping 35c at a rate that maintains an internal pressure of 1,500 psi within the vessel 20. The vessel bottom exhaust speed valve 2B and the inert gas inlet speed valve 3B are adjusted to control the internal pressure within vessel 20 and the turnover rate of supercritical $CO_2$ exiting and inert gas entering the vessel 20.

Exhausting supercritical $CO_2$ from vessel 20 will cause the formation of frost on the exterior of the exhaust piping 35a, 35b, 35c. When the supercritical $CO_2$ has stopped flowing from the vessel 20 and only inert gas remains in the vessel 20, inert gas will begin flowing out of the vessel 20. The inert gas flowing through exhaust piping 35a, 35b, 35c will cause the frost on the piping 35a, 35b, 35c to melt indicating that the vessel 20 no longer contains any supercritical $CO_2$ and the vessel bottom exhaust speed valve 2B is closed. Additionally, there is an audible change in pitch as the gas exhausting from piping 35c changes from supercritical $CO_2$ to inert gas.

The turnover of supercritical $CO_2$ to inert gas continues until there is a measured drop in pressure in the inert gas second tank 40, preferably from 3000 psi down to 1,600 psi or sufficient time has passed that all of the supercritical $CO_2$ is known to have been exhausted. At this point, the vessel bottom exhaust speed valve 2B is closed and the inert gas dwell will be started which is the same as set forth above, but is repeated below.

Inert Gas Dwell

During the inert gas dwell step, the inert gas inlet valve 3 and the inert gas inlet speed valve 3B are left open to maintain 1,500 psi inert gas in the vessel 20 and all other valves are closed. The heater 28 remains on and is set to 35° C. The stirrer 21 is also turned on. The elastomers are then incubated in the vessel 20 for a predetermined amount of time sufficient to penetrate the elastomeric materials, typically 60 to 300 minutes followed by depressurization of the vessel 20. The time will vary depending upon the elastomeric materials being treated. After the inert gas dwell is completed, depressurization begins.

Depressurization

During the depressurization step, the heater 28 and the stirrer 21 remain on and the inert gas inlet speed valve 3B is closed. The inert gas inlet valve 3 is then closed. The vessel bottom exhaust valve 2 is opened and the vessel bottom exhaust speed valve 3B is opened to let the inert gas out of the bottom 20b of the vessel 20 at a predetermined rate. Once the vessel 20 is depressurized to 0 psi and no audible depress sound is heard, the heater 28 and stirrer 21 are turned off, and the vessel 20 can be opened to retrieve the processed elastomeric materials. Due to the removal of the supercritical $CO_2$ and the inert gas dwell, the elastomeric materials do not balloon or distort and continue to be usable for their intended purpose.

After depressurization the vessel 20 is opened and the materials that have been treated are retrieved.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A process for treating elastomeric materials with supercritical $CO_2$ such that they can be used or reused as intended prior to exposure to supercritical $CO_2$, comprising:
   loading the elastomeric materials into a vessel and closing the vessel;
   introducing $CO_2$ into the vessel and creating a supercritical $CO_2$ environment within the vessel;
   subjecting the elastomeric materials contained within the vessel to the supercritical $CO_2$ environment for a predetermined period of time;
   after the predetermined period of time introducing an inert gas under controlled pressure into the vessel to force the supercritical $CO_2$ out of the vessel;
   continuing introducing inert gas until the supercritical $CO_2$ has been exhausted from the vessel;
   maintaining the inert gas within the vessel at least 1,500 psi to create an inert gas environment within the vessel to subject the elastomeric materials contained within the vessel to the inert gas environment for a time period sufficient to penetrate the elastomeric materials; and depressurizing the vessel to 0 psi by exhausting the inert gas from the vessel.

2. The process for treating elastomeric materials as set forth in claim 1, further including the step of opening the vessel to retrieve treated elastomeric materials after depressurization.

3. The process for treating elastomeric materials as set forth in claim 1, including the step of filling the vessel with an inert gas under pressure prior to introducing $CO_2$ into the vessel and creating a supercritical $CO_2$ environment within the vessel.

4. The process for treating elastomeric materials as set forth in claim 1, wherein all of the supercritical $CO_2$ is exhausted from the vessel before the elastomeric materials are subject to the inert gas environment.

* * * * *